(Specimens.) M. PRIDHAM. 2 Sheets—Sheet 1.
PROCESS OF PURIFYING AND DECOLORIZING SACCHARINE OR OTHER LIQUIDS.
No. 573,290. Patented Dec. 15, 1896.
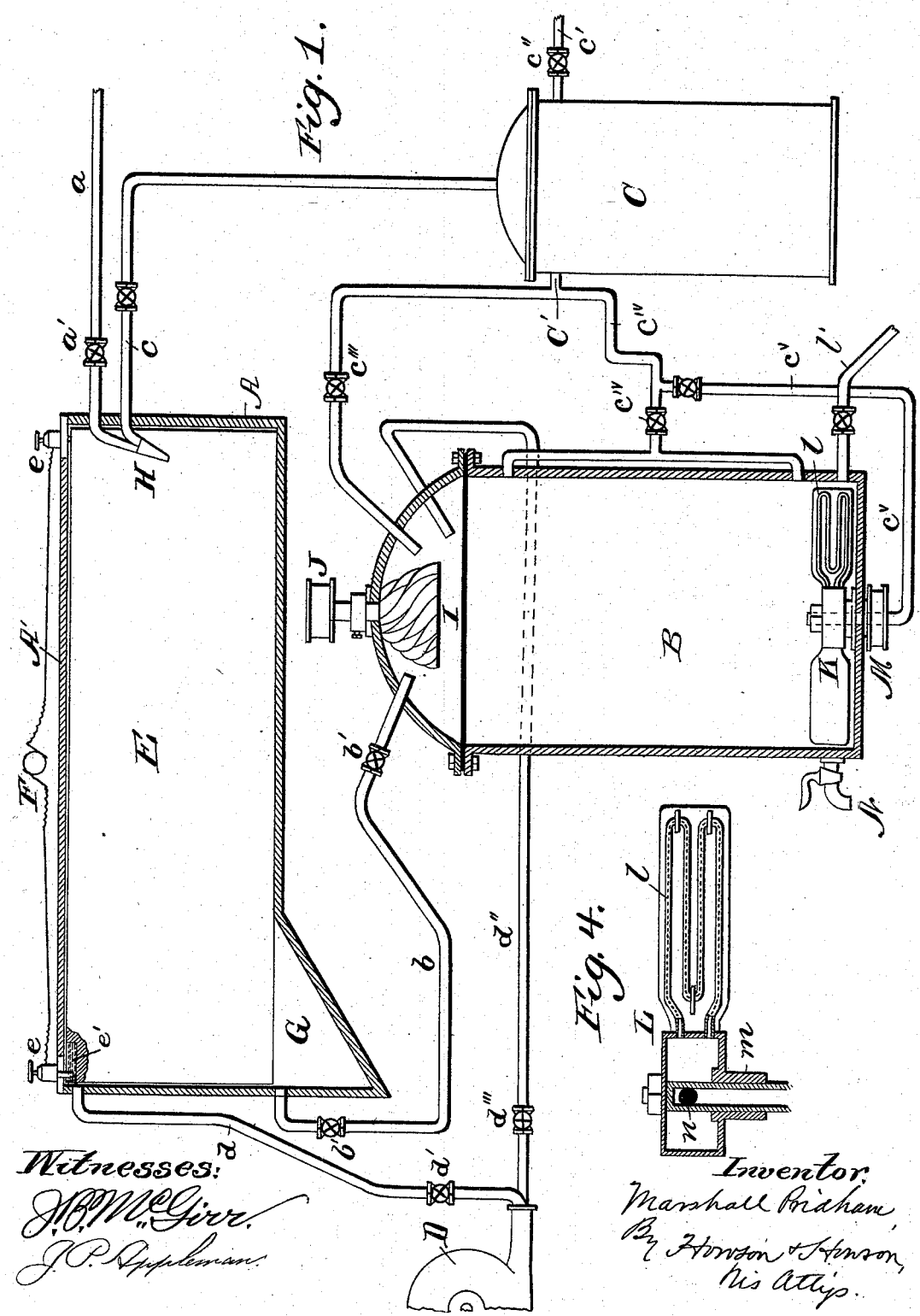

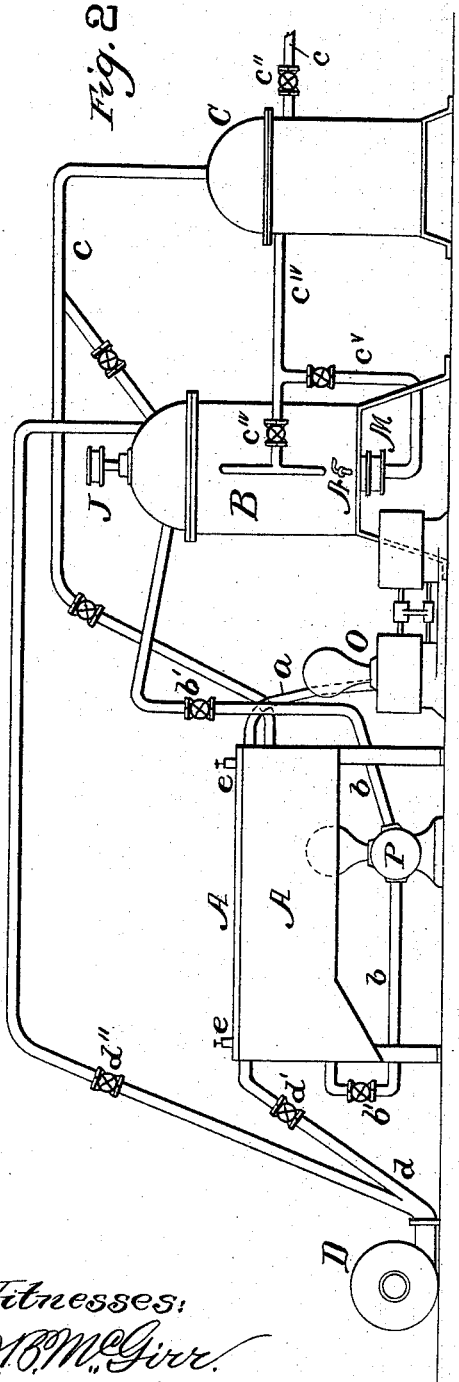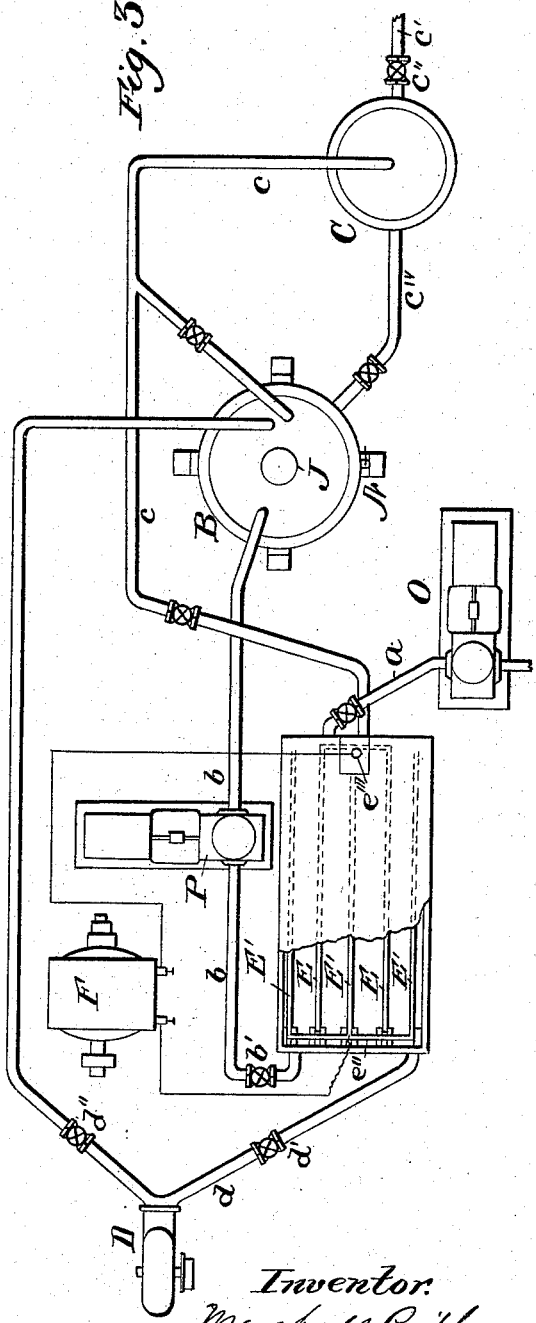

UNITED STATES PATENT OFFICE.

MARSHALL PRIDHAM, OF PHILADELPHIA, PENNSYLVANIA, ASSIGNOR TO THE ELECTRIC RECTIFYING AND REFINING COMPANY, OF SAME PLACE AND CAMDEN, NEW JERSEY.

PROCESS OF PURIFYING AND DECOLORIZING SACCHARINE OR OTHER LIQUIDS.

SPECIFICATION forming part of Letters Patent No. 573,290, dated December 15, 1896.

Original application filed September 10, 1896, Serial No. 605,441. Divided and this application filed October 15, 1896. Serial No. 608,988. (Specimens.)

*To all whom it may concern:*

Be it known that I, MARSHALL PRIDHAM, a citizen of the United States, residing in Philadelphia, Pennsylvania, have invented a certain Process of Purifying and Decolorizing Saccharine or other Liquids, of which the following is a specification.

My invention relates to a new and useful process for the treatment of syrups, molasses, sugar, and other saccharine solutions or other liquids containing organic, nitrogenous, or mechanical impurities, such as water, &c., whereby the mechanical impurities and organic substances contained therein may be efficiently and economically removed therefrom, and whereby the said liquids may be clarified and decolorized to the highest degree.

In the present state of the art the process of removing the mechanical impurities and organic substances from saccharine liquids in general use necessitates the employment of the bag-filter process, which is cumbersome, wasteful, and expensive both as to time and labor required, whereas in my process I propose to dispense entirely with this bag-filter process, accomplishing the same or better results in minutes, as compared to hours now required, thus reducing the expense in this step of the treatment to an extent of seventy-five per cent. at least.

Again, in the present method of clarification and decolorization of saccharine liquids animal char is universally used for filtration, and in this char process of filtration enormous quantities of water are demanded daily. The char must be revivified daily by being reburned or recalcined, necessitating the use of large quantities of coal for this part of the process alone and requiring the employment during the whole twenty-four hours of the day of a number of hands, while the maintenance of the char-filter by the frequent rebuilding of the charcoal-kilns during the year involves large expenditures of time, money, and labor, whereas by my process of clarification and decolorization this step of char filtration is entirely dispensed with, thus obviating the expenditure incident to the use of this old step.

With these facts in view the object of my invention is to provide a new process for treatment of saccharine liquids whereby the elimination of impurities, organic and nitrogenous substances, from saccharine and other liquids and the clarification and decolorization of the same may be effected by electrolytic action and by subjecting the liquids to the action of ozone gas *in vacuo* or in air and by the combined action of ozone gas and the oxids and oxyhydrates of metal developed by electrolysis.

By the use of my process the fungi *Saccharomyces cerevesiæ*, *Pencillium glaucuum*, and fungi of all descriptions are destroyed, the inversion in sugar is prevented, and fermentation in cane, beet, and sorghum sugar, raw sugar, syrups, molasses, dextrose, levulose, and glucose is effectually arrested and prevented.

In carrying out my process I may treat the saccharine liquids upon the plantation where the cane-sugar or saccharose ($C_{12}H_{22}O_{11}$) is obtained from expressed juice of the cane, (*Saccharum officinarum*,) beets, and sorghum, so as to prevent or arrest fermentation, and combine this treatment at the same place with a further treatment for the purification, clarification, and decolorization of the liquids, or I may merely subject the liquid for treatment to the first step of the process for the purpose specified and complete the treatment at the refinery to which the treated liquids are sent, or the whole process may be carried out at the refinery, and when describing my process I will preferably locate the steps at one place, illustrating the mode of carrying out the treatment by means of apparatus grouped at such place, with the distinct understanding that I do so merely for the purpose of a brief and lucid description of the process and not for the purpose of limiting the process to that extent.

In the treatment of saccharine liquids under my process I proceed by introducing a sufficient quantity of the liquid into a suitable tank or vessel provided with plates of suitable material forming positive and negative electrodes, connected, preferably, to a generator for creating a direct current of electricity. This tank may be connected with a reservoir containing ozone gas, derived from a suitable source, and may also be connected by piping to a vacuum-pump or air-exhauster, valves being provided in all of the pipe connections with the tank, as desired. The tank is preferably made air-tight, so that a vacuum or partial vacuum may be created therein before or after the liquid is introduced, and of course the said tank must be lined with any suitable material, preferably porcelain or other glazed material, so as to prevent oxidation and the escape through its walls of the ozone gas. The liquid to be treated is introduced into the tank and the current is applied to the liquid, so as to cause the passage of a direct current of electricity through the same. Under the electrolytic action set up by the current of electricity passing from the positive electrodes through the liquid to the negative electrodes the gases evolved from the water contained in the liquid attack the organic and nitrogenous matter contained therein and cause the said impurities to be oxidized by or to form other chemical combinations with such gases, which will be deposited or precipitated, so as to free the liquid therefrom.

I find that the electrolytic action is greatly assisted by the use of aluminium electrodes, since the action of the gases evolved under the electrolysis is to attack the aluminium of the plate, forming aluminium hydrate, which is a decolorizing agent for saccharine liquids, and I therefore greatly improve this action by using a positive plate in the form of a grid or perforated, pitted, or corrugated conductor of aluminium or other suitable material having the pits, corrugations, or openings filled with aluminium hydrate. In the electrolytic action the electrolytically-developed aluminium hydrate is deposited upon the cathode and has a decolorizing effect upon the liquid under treatment, and after such treatment this aluminium hydrate is recovered by washing the plates with water, collecting the washings in a suitable receptacle, from which the foreign matter is then removed and the aluminium hydrate finally precipitated and recovered for further use. I mention this not as a limitation of the broad invention embodied in my process, but as defining a preferable form of positive electrode, by the use of which the electrolytic action upon the liquid may be greatly facilitated.

I have found that good results may also be obtained by the use of zinc electrodes and zinc oxid when complete decolorization is not necessary, and as the zinc oxid is insoluble in water and saccharine liquids it can be recovered in the same manner as the aluminium hydrates, and hence may be considered equivalent thereto for the purpose of the present invention, and as its first cost is much less than the aluminium hydrate I prefer to use the zinc plate and the zinc oxid when possible. Any other suitable metal plate and compound capable of decolorizing the liquids may be used, though I have found the two mentioned to be preferable. The negative plate in such cases is preferably made of a neutral material, such as carbon, and is provided with pits, openings, or cells, in which the foreign matter will be deposited, together with the hydrates of aluminium or zinc oxid, that are subsequently recovered, as above defined. After the completion of the electrolytic treatment the air in the tank and contained in the liquid is exhausted by the vacuum-pump, and when a sufficient vacuum is obtained the ozone is admitted to the tank, the result of which admission is that the ozone permeates thoroughly the liquid and moves in intimate contact with every part thereof, filling the spaces previously occupied by the air. In order to effect the most thorough contact with every part of the liquid, the ozone is preferably introduced at the bottom and sides of the tank.

While it is not absolutely necessary to heat the liquid before subjecting it to the action of the electric current and the ozone gas, I should state that in the treatment of all saccharine liquids, except the juice expressed from cane, beets, or sorghum, it is advisable to heat the liquid from 70° to 90° centigrade, according to the gravity and coloring of the liquid, the very dark liquid receiving most heat. The object of thus heating the liquid, such as sugar solutions, molasses, &c., before treatment by electrolysis is to render the same readily oxidizable by electrochemical action, in order to assist the deposition of organic and nitrogenous matter, which is particularly desirable in liquids containing albumen, that coagulates and carries with it the impurities.

If the specific gravity of the liquid is too great, the work of removing the mechanical impurities is greatly retarded, and consequently the decolorizing action is retarded, and in order to overcome this I preferably reduce the gravity by the addition of water, which is afterward removed by addition of heat or by electrolysis, and in this connection I may state that I find that where the specific gravity is below 40° Baumé the liquid may be treated without the reduction stated, while above this limit it is advisable to reduce the gravity to a point between 30° and 40° Baumé.

The action of ozone gas upon the impurities of the liquid is to immediately oxidize them, thereby aiding in the deposition of the impurities, which has already been partially accomplished by the electrolytic action, thus freeing the liquid from the said impurities, while at the same time the ozone clarifies and decolorizes the liquid.

While I prefer to carry on both the electrolytic and the ozone treatments in the same tank, I may in some cases use independent tanks, the liquid being subjected to electrolytic treatment in the first tank and then conveyed to the second tank and there subjected to the action of ozone gas *in vacuo*, the said tank being connected with the vacuum-pump and preferably located on a lower level from the first tank, so that liquid may flow thereinto by gravity. In this second tank a suitable agitator may be placed for thoroughly agitating the liquid under treatment, thereby inducing a more intimate and thorough contact of the liquid with the ozone. By the employment of the vacuum in connection with the ozone I am enabled to charge the liquid with a much larger amount of ozone gas than would otherwise be possible, and for this reason I prefer to use the vacuum in all the treatments. I may sometimes, however, when circumstances require it, omit the vacuum step. In such cases the electrolytic action should still be used in advance of the ozone treatment, for the reason that the oxidizing action of the gas upon certain oxidizable impurities renders the deposition of said impurities more complete.

While it is preferable to first establish the vacuum or partial vacuum and then introduce the ozone gas, for the reason that the action of the ozone upon the liquid is greatly increased by the removal of the air, I wish it understood that my process is not limited to this order of procedure, as these two steps may be carried on simultaneously without seriously impairing the efficacy of the whole process.

In carrying out the process as above described I find that usually it requires from three to five hours to complete the treatment with the current varying in strength from five to ten volts and in quantity from fifty to sixty amperes per square meter of electrodes used, the time of electrolytic treatment depending upon the character of the liquid and of the impurities contained therein.

With this elucidation of my process I will now describe one form of apparatus in which it may be carried out, premising that the form and arrangement may be varied as desired to suit the surrounding circumstances, and the character of the electrodes, the strength of the current of electricity, the amount of the ozone gas, &c., and the preliminary treatment of the liquid by heating or by adding the water for reducing the gravity of the liquid being susceptible of variation according to the character of the liquids treated in each case.

In the drawings I have shown two arrangements of apparatus, in one of which the tanks are so arranged that the liquid may flow from one to the other by gravity, and in the other form the tanks are arranged on the same level, so that pumps are used to carry the liquid from one tank to the other.

Referring to the drawings, Figure 1 is a sectional side elevation of one form of apparatus for carrying out my process. Fig. 2 is a side elevation of a modified form for carrying out my process. Fig. 3 is a top plan view of the same, partly in section. Fig. 4 is a detail view of the agitator.

In all of the views the same characters relate to the same or corresponding parts, and referring first to Fig. 1, A designates a tank of any suitable size and shape, preferably of rectangular form, to which tank is connected the pipe $a$ for introducing therein the liquid for treatment, which pipe is provided with a valve $a'$, the said pipe preferably terminating in a suitable injector H, to which is also connected a pipe $c$, leading from a reservoir C, containing the ozone gas, derived from a suitable generator connected to said reservoir by a pipe $c'$, provided with a valve $c''$. A vacuum-pump D or air-injector of any suitable form is connected by a pipe $d$, provided with a valve $d'$, to the tank A, whereby a vacuum or partial vacuum may be established in the tank A, as desired, the connections between the air-exhaust $d$ and the tank being shown, for convenience, at the left-hand end of the tank A.

Suitably supported within the tank A are the electrodes E E', Figs. 1 and 3, the former of which are the anodes and the latter the cathodes, there being shown three of such cathodes and two anodes connected, respectively, to the binding-plates $e''$ and $e'''$. Mounted in the cover A' of the tank A are suitable binding-posts $e$, preferably insulated from the tank, the lower ends of the metallic conductors of said posts being adapted to dip into the groove $e'$, filled with mercury, arranged on the upper edge of one or more of the electrodes or upon the binding-plates $e''$ $e'''$, connecting the different electrodes in series. These electrodes are arranged a sufficient distance apart in the tank so that they can be readily cleansed and renewed without removing them from the tank.

The electrodes in the tank are connected through the respective binding-posts and line-wires to a suitable generator F, (shown in Figs. 1 and 3,) preferably a direct-current generator, between which and the tank, of course, there will be placed the usual accessories for changing the strength of the current, cutting it off, &c., such as switches, transformers, and the like. (Not shown in the drawings, as they form no part of my invention and may be of any suitable design.)

One end of the tank A is preferably provided with a depressed portion G, forming a well into which the precipitated impurities may be removed from time to time.

From the foregoing description of the construction, taken in connection with the description of my process hereinbefore set forth, the manner of using the apparatus thus described for carrying out my process will be readily understood without further description.

Generally, as before indicated, a treatment in this tank alone will be sufficient; but in some cases I employ a second tank B, connected to the tank A by a pipe $b$, provided with a valve $b'$. This tank B for the treatment of the liquid with ozone gas is connected by pipe $d''$ to the vacuum-pump or air-exhauster D, the said pipe being provided with a suitable valve $d'''$, whereby a vacuum may be established in said tank. In the top of said tank, which is secured to the body with an air-tight joint, is preferably mounted a spraying-cone I, adapted to be rapidly rotated by a driven pulley J, operated from any suitable source of power, the discharge-pipe $b$ from the tank A opening in front of said spraying device in tank B, on the other side of which sprayer is preferably arranged the inlet end of one branch $c'''$ of the pipe C', leading from the ozone-reservoir, thus discharging the gas against the spraying device at the same time that the liquid from the tank A is discharged against said device on its opposite side as said sprayer is rotated rapidly, thereby breaking up the liquid into fine particles and insuring a thorough and intimate contact of the gas with said particles; and to further insure the intimate mixture of the gas and liquid in this tank two other valved branch pipes $c^{iv}$ $c^{v}$ conduct the gas into the tank, the one at one or more points at the side of the vessel or tank B and the other through the bottom. In order to secure the highest degree of efficiency, I preferably mount in the bottom of the tank an agitator K, consisting of a chambered hub L, having projecting therefrom a suitable number of blades or vanes $l$, preferably four, the said hub being rotatably mounted upon the upper end of the pipe $c^v$, extending upwardly through the bottom of the tank B, which pipe is provided with orifices $n$, opening into the hollow hub L. Secured to the face of the blades $l$ are perforated pipes $l'$, communicating with the hub L, through which pipes the ozone gas has ready access to the interior of the tank B. The agitator K is rotated in any suitable manner, for example by means of the pulley M, mounted upon the extension $m$ of the hub L, passing downwardly through the bottom of the tank, all of the joints being suitably packed to prevent the escape of gas or liquid.

The vacuum-pump is connected with the tank B and a partial vacuum created therein and the liquid then allowed to flow by gravity from the tank A into the tank B, the ozone gas being at the same time turned into said tank through the various pipes mentioned, the sprayer and agitator being rapidly rotated, so that the liquid in said tank is subjected to an intimate and thorough mixture with the gas, and the treatment is continued until the said liquid is thoroughly clarified and decolorized. The tank may then be cut off from the gas-supply, the sprayer and agitator stopped, and the contents drawn off through the discharge-pipe N.

In Fig. 2 I have shown a modified arrangement in which the tanks instead of being located on different levels are on the same level, in which case the liquid is pumped into the tank A by means of a pump O, either centrifugal, reciprocating, or other form, and from the tank A the liquid is pumped in the tank B by a pump P, the other parts remaining precisely the same as defined.

In the use of my invention upon the plantation I find that by subjecting the liquid expressed from the juice to treatment, as described, I am able to cause the removal of albuminous and waxy matters having a tendency to ferment without the addition of the milk of lime and heat, as now generally practiced to prevent and arrest fermentation. I also find that I can prevent the tendency of inversion in sugars, so that the liquid may be subsequently treated on the spot or transported for further treatment without danger of fermentation during transportation or danger of inversion in the subsequent steps for crystallization. In this connection I may state that I have found by experiment that the inversion that sugar undergoes in the presence of water is but partly due to the influence of mold or fungi, and is largely due to the fact that water acts as an acid, hydrates the saccharine matter in the sugar-cane in the presence of air, and consequently by my electrolytic vacuum and ozone treatment I entirely destroy this tendency. I should add that, of course, whenever any evidence of granulation appears in the syrup under treatment the granulation may be prevented by the addition of glucose in sufficient quantity, depending upon the character and grade of syrup, as is well understood by those skilled in the art. I should further say that by the use of the terms "electrolytically-developed metallic decolorizing compound" or "aluminium hydrates" I intend to include not only those compounds that are developed directly from the electrodes themselves, but also those which are detached from the said electrodes by the action of the electric current, as hereinbefore fully described.

I do not herein claim the apparatus disclosed, as that forms the subject-matter of a separate application filed by me September 10, 1896, Serial No. 605,631. Nor do I claim the subjecting of the liquid to electrolytic action simultaneously with the passage of ozone gas through the same, as this forms the subject of an application filed by me on the 10th day of September, 1896, Serial No. 605,441, of which this present application is a division; but

I claim as my invention and desire to secure by Letters Patent—

1. The herein-described process of purifying saccharine or other liquids, which consists in subjecting the liquid to the direct action of an electric current and subsequently passing ozone gas through the liquid, substantially as specified.

2. The herein-described process of purifying saccharine or other liquids which consists in subjecting the liquid *in vacuo* to the direct action of an electric current, and subsequently passing ozone gas through the liquid, substantially as specified.

3. The herein-described process of purifying saccharine or other liquids, which consists in subjecting the liquid to the direct action of an electric current and subsequently passing ozone gas through the liquid while the same is in a state of agitation, substantially as specified.

4. The herein-described process of purifying saccharine or other liquids, which consists in first reducing the gravity of said liquid by the addition of water, and heating the same, and then subjecting the liquid so treated to the direct action of an electric current, and subsequently passing ozone gas through the liquid, substantially as specified.

5. The herein-described process of purifying saccharine or other liquids which consists in subjecting said liquid to the action of electrolytically-developed aluminium hydrates and subsequently passing ozone gas through the liquid, substantially as specified.

6. The herein-described process of purifying saccharine or other liquids, which consists in subjecting said liquid *in vacuo* to the action of electrolytically-developed aluminium hydrates, and subsequently passing ozone gas through the liquid, substantially as specified.

7. The herein-described process of purifying saccharine or other liquids, which consists in subjecting said liquid to the action of electrolytically-developed metallic decolorizing compounds, and subsequently passing ozone gas through the liquid, substantially as specified.

8. The herein-described process of treating saccharine or other liquids, which consists in subjecting said liquid *in vacuo* to the action of electrolytically-developed metallic decolorizing compounds, and subsequently passing ozone gas through the liquid, substantially as specified.

In testimony whereof I have signed my name to this specification in the presence of two subscribing witnesses.

MARSHALL PRIDHAM.

Witnesses:
R. T. FRAZIER,
WILLIAM A. MEARS.